Figure 1:
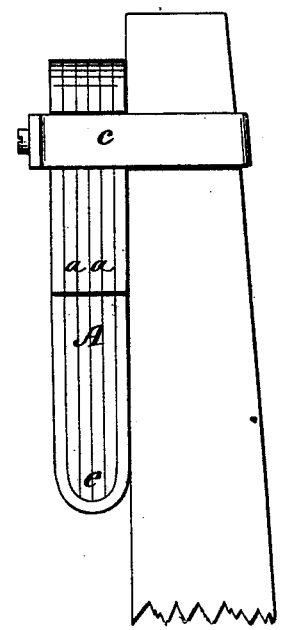

A. I. EARLE.
STAFF-PICKERS FOR LOOMS.

No. 189,712. Patented April 17, 1877

Attest:
Philip H. Garner
A. B. Cauldwell

Inventor
Anthony I. Earle
By McLeod
Attorney

UNITED STATES PATENT OFFICE.

ANTHONY I. EARLE, OF VALLEY FALLS, RHODE ISLAND, ASSIGNOR OF ONE-HALF HIS RIGHT TO GEORGE A. JORDAN, OF SAME PLACE.

IMPROVEMENT IN STAFF-PICKERS FOR LOOMS.

Specification forming part of Letters Patent No. 189,712, dated April 17, 1877; application filed February 9, 1877.

*To all whom it may concern:*

Be it known that I, ANTHONY I. EARLE, of Valley Falls, in the county of Providence, and State of Rhode Island, have invented a certain new and useful Improvement in Staff-Pickers for Looms; and I do hereby declare that the following specification, taken in connection with the drawing furnished and forming a part of the same, is a clear, true, and complete description thereof.

There are two general classes of loom-pickers, properly termed "rod-pickers" and "staff-pickers." The rod-picker is provided with a tubular shank, which loosely embraces a rod on which the picker is driven to and fro. The staff-picker is attached by a loop or other device directly to the picker-staff and moves to and fro with it.

My improvement relates to staff-pickers; and the object thereof is to increase their durability, and this has been practically accomplished, so far as to result in a saving of upward of fifty per cent., as compared with other pickers of this class, as generally heretofore made.

My invention consists in a staff-picker composed of several layers of hide, or other suitable material, and having its front and rear layer composed of a continuous strip, which is bent around the foot of the picker, whereby the layers at the foot are securely bound together and prevented from separation, thus enabling the picker to be used so long as its striking-face is capable of properly striking a shuttle.

To more particularly describe my invention, I will refer to the accompanying drawings, in which—

Figure 2:
Figure 3:
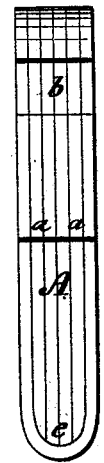
Figure 4:

Figure 1 represents, in side view, one of my pickers applied to its staff. Fig. 2 represents the same in front view. Fig. 3 represents, in side view, my picker detached. Fig. 4 represents, in side view, a staff-picker as heretofore made.

A denotes the picker, composed of the several layers $a$. Its head at $b$ is recessed on the sides so as to receive the loop $c$, which is secured at the front of the picker by a screw. The loop is large enough to receive the upper end of the staff, which is tapered so that on forcing the picker and loop downward they are firmly held on the staff at the proper height with relation to the shuttle-race.

The striking-face of the picker is shown at $d$, the blow on the point of the shuttle being delivered by the center of the face. The foot of the picker is shown at $e$. Instead of having the front and rear layers composed of separate pieces of hide, as heretofore, and, as illustrated in Fig. 4, I form them of a continuous strip, which is bent around the heel, as shown in the drawings. The usual compressing operations and adhesive matter are requisite.

It will be seen that the loop $c$, in binding the picker to the staff, securely binds the several layers at the head of the picker, and that they therefore cannot possibly become separated, and that the continuous strip which forms the front and rear layers effects such a binding of the layers at the heel of the picker that under no circumstances can they ever become separated, so long as the layers at the head remain united.

This novel feature enables my improved pickers to outwear two, three, and sometimes four of the ordinary pickers, and they render good service until the striking-face is absolutely worn out, and in many cases it is even then practical to reverse them on the staff and obtain considerable good service from the rear face of the picker.

I am aware that rod-pickers have been composed in whole or in part of continuous layers of hide or leather, but with them this is a necessity, in order to form the tubular portion for embracing the rod, and also in some cases in order to embrace the coiled hide, which is presented edgewise in striking the shuttle.

I am also aware that rivets have been heretofore employed for uniting the layers of leather in staff-pickers, thereby condensing the leather so far as to materially impair the efficiency of the picker; but I am not aware that prior to my invention the foot of a staff-picker was ever secured by forming the front and rear layers of a continuous length of hide and bending it around the foot.

Having thus described my invention, I claim as new and desire to secure by Letters Patent—

A staff-picker for looms, composed of several layers of hide or other suitable material, compressed and united, and having its front and rear layers composed of a continuous piece of hide bent around the foot of the picker, substantially as described.

<div style="text-align:right">ANTHONY I. EARLE.</div>

Witnesses:
   CHAS. H. RANDALL,
   CHAS. E. SPRING.